July 27, 1943.  I. E. MUSKAT  2,325,192
CHLORINATION OF CHROMIUM BEARING MATERIALS
Filed Oct. 13, 1941
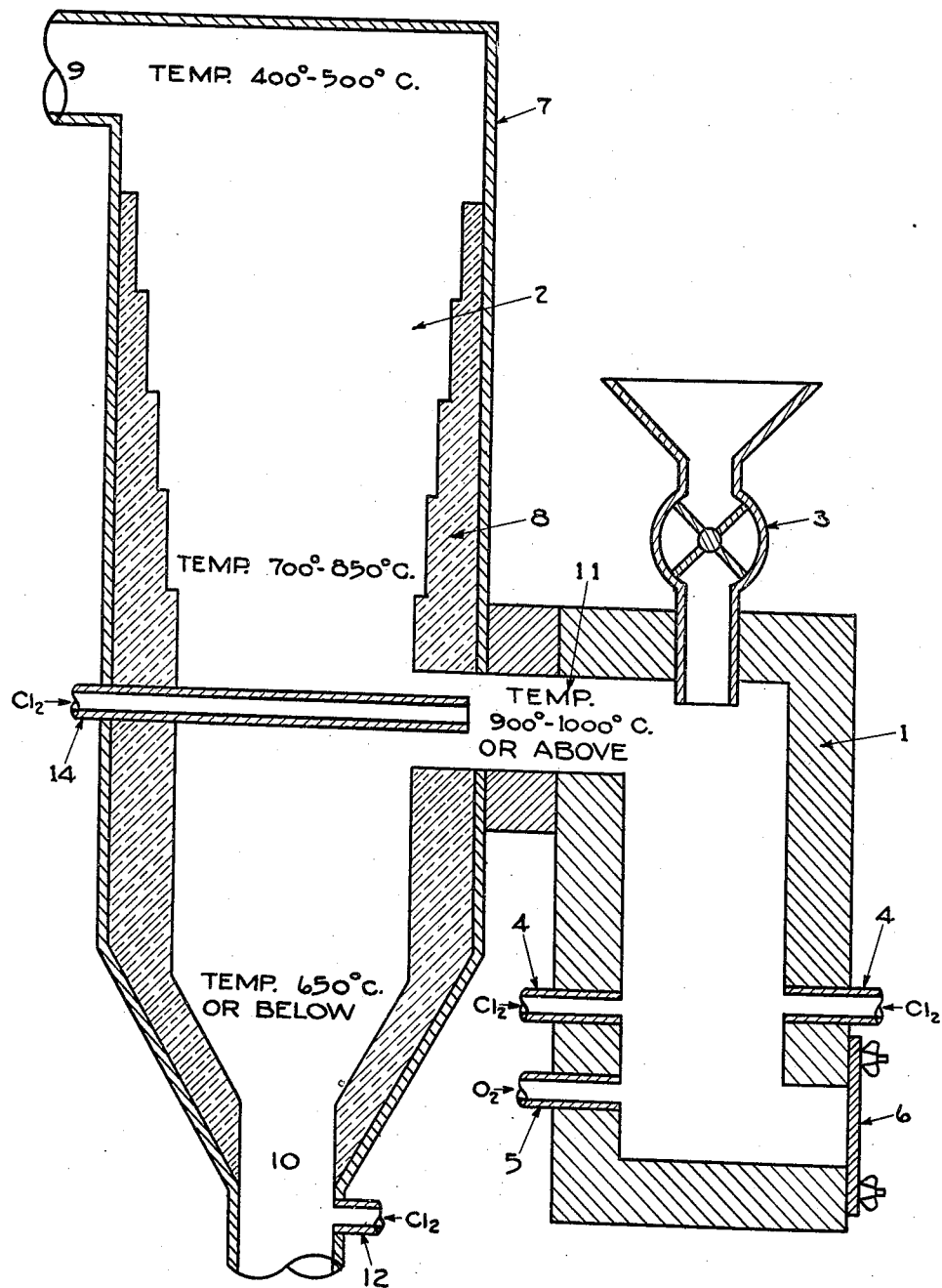
INVENTOR.
IRVING E. MUSKAT Patented July 27, 1943

2,325,192

UNITED STATES PATENT OFFICE 2,325,192

CHLORINATION OF CHROMIUM BEARING MATERIALS

Irving E. Muskat, Akron, Ohio, assignor to Pittsburgh Plate Glass Company, Pittsburgh, Pa., a corporation of Pennsylvania Application October 13, 1941, Serial No. 414,755

8 Claims. (Cl. 75—112)

This invention relates to the chlorination of chromium bearing materials such as chromite ore or other chromium oxide bearing ore, ferrochrome, chromic oxide, etc., and to the recovery of chlorides of chromium thereby. In a prior United States Letters Patent No. 2,185,218, granted to myself and Norman Howard, methods of chlorinating such materials have been described and claimed, whereby a vaporized mixture of iron and chromium chlorides is formed. In order to recover the chlorides of chromium therefrom, the vapors are cooled to a temperature below about 800° C.

The condensed chloride thus obtained is often of poor color and appearance and is in the form of very finely divided crystals. Furthermore, when iron chloride or similar halide is present, a method involving fractional condensation of iron and chromium chlorides is frequently resorted to and the chromium chloride obtained often is impure and contains a substantial quantity of iron. In addition, it is often difficult to cool the vapors with sufficient rapidity to produce relatively large crystals.

In accordance with the present invention, I have found that the condensation of chromium chloride may be substantially assisted by adding a quantity of chlorine to the chromium chloride vapor prior to or during condensation of the chloride. I have found that if chromium chloride is fractionally condensed from iron chloride by such a process, a product is secured of substantially higher purity than that prepared by ordinary methods. If, on the other hand, iron and/or magnesium chloride and chromium chlorides are condensed together, the chromium is found to be in the form of highly insoluble crystals which may be leached with water to remove iron and magnesium chloride without extraction of a substantial quantity of the chromium chloride. Moreover, the introduction of the chlorine appears to improve materially the efficiency and speed of the condensation.

The invention is particularly directed to the condensation of chromium chloride from vapors such as are obtained by chlorination of chromium ores or other chromium bearing material at a temperature above 850° C. such as the vapors produced in accordance with the process of the above-mentioned Letters Patent, or the processes described in my Letters Patent Nos. 2,240,435, and 2,242,257. However, it may be applied to the treatment of other vapors containing chromic and/or chromous chloride or other chromium chloride such as those obtained by subliming chromic chloride for purification purposes or from the chlorination of ferrochrome.

The process is generally conducted in a manner such as to secure fractional condensation of chromic chloride from vaporized condensation of chromic chloride from vaporized iron chloride. In such a case the temperature is maintained above about 350° C. and below about 850° C. In some cases, however, more or less iron chloride may be condensed with the chromium chloride and, where this is deemed desirable, substantially lower temperatures of condensation, for example 100° C., or below, may be used. If desired, the condensation may be conducted in a series of stages wherein a portion of the chromium chloride may be separately condensed in a highly purified form and thereafter iron and chromium chlorides are simultaneously condensed in a further operation. If magnesium chloride is present this chloride generally condenses with the chromic chloride and may be removed by extraction with water.

The invention is particularly applicable for use in treatment of vapors produced by reaction of a chromium bearing material with an amount of chlorine not appreciably in excess of the theoretical for formation of $CrCl_3$. Such vapors generally comprise a mixture of chromic and chromous chlorides and more or less iron chloride, but contain no substantial quantity of elemental chlorine. They may be prepared by the process described in my application for Letters Patent Serial No. 378,084 filed February 8, 1941.

In accordance with the process described in such application, chromite ore or similar material is introduced into a shaft furnace and is subjected to the action of chlorine in amount not in excess of that theoretically required for chlorination of the metal bearing constituents to form ferric and chromic chloride. By this means a substantial quantity of chromous chloride is formed and vaporized. This chromous chloride containing vapor is then mixed with chlorine in accordance with the present invention and chromic chloride is condensed. This process eliminates the necessity of introducing into chlorination furnaces large excesses of chlorine which have been essential in the prior chlorination processes resulting in the formation of chromic chloride and/or chromium tetrachloride. Such large excesses are particularly objectionable since the amount of gas introduced into the chlorination furnace is thereby increased and consequently the tendency for the ore bed to channel or for a portion thereof to blow over into the condenser is thereby increased. By the present process less chlorine is required and many of these difficulties are avoided.

The amount of chlorine to be introduced into the vapors is capable of considerable variation, depending upon whether or not an excess of chlorine is used in the chlorination step. Thus, where an excess of chlorine is used, some chlorine may be present in the chloride vapors and correspondingly less chlorine may be required. In any case, however, the chlorine concentration of the vapors should be substantially increased in most cases at least 5 to 10 volumes of chlorine is introduced, per 100 volumes of chlorine introduced into the chlorination furnace for chlorination purposes. Substantially larger quantities of chlorine, for example, one or more volumes per volume of vapor undergoing treatment may be used, particularly where it is desired to assist cooling of the vapors. Chlorine diluted with nitrogen or other nonreactive gas may also be treated provided that such diluted gas contains at least about 20 to 25 percent of chlorine by volume.

The invention will be more fully understood by reference to the accompanying drawing which is a diagrammatic sectional view of an apparatus capable of use in accordance with the present invention. As therein illustrated, the apparatus comprises a chlorination shaft furnace 1, connected to a condenser 2. The furnace is provided with a hopper and feeder 3, for feeding the ore into the furnace, chlorine tuyères 4, air or oxygen tuyères 5, and a suitable outlet for unchlorinated residue 6. The condenser comprises a cylindrical shell 7, lined with heat insulation 8. In order to permit the establishment of zones of different temperature throughout the column, the thickness of the insulation is varied, tapering as illustrated, toward the upper portion of the tower so that the uppermost portion thereof may be substantially uninsulated and temperatures within the column may be established as indicated in the drawing. In like manner, the thickness of insulation at the base of the condenser may be less than that at the central portion thereof. The condenser is provided with an inlet 11, for introduction of chloride vapors, an outlet 10, for removing condensed chloride, and an outlet 9, for removal of gases. Often the condenser inlet is located so as to introduce the halide vapors tangentially in order to cause the gases to whirl within the condenser. The condenser is also provided with an inlet tube 14 for introduction of chlorine. This inlet tube may extend into the condenser inlet 11, or may be placed in any convenient location to permit dilution of the vapors by chlorine.

Chlorine is introduced in gaseous or liquid state through the tube 14 into the inlet 11, where it mixes with the incoming vapors. This chlorine materially assists the condensation and minimizes or prevents condensation of the chloride in the chromous state. Furthermore, it minimizes condensation of iron chloride.

Chromium chloride crystals are formed during upward passage through the condenser and fall through the condenser to the base thereof and are removed through outlet 10. In many cases, it is desired to heat the solid chromium chloride in an atmosphere of chlorine or other halogen to increase the purity and crystal size in accordance with the method described in an application for Letters Patent Serial No. 404,230, filed July 26, 1941, by Alphonse Pechukas. In such case, chlorine or halogen may be introduced through inlet 12, whereby the settling chloride is bathed with the incoming chlorine. In some cases the inlet 14 may be eliminated and the entire quantity of chlorine introduced through inlet 12, sufficient chlorine being introduced to insure addition of chlorine to the vapors as well as to treat the solid condensed chloride.

In order to maintain the process in continuous operation it is preferred to introduce ore, chlorine and carbon and oxygen if necessary, into the furnace reactor at a rate sufficient to maintain the temperature of reactor at least 900° C. and preferably above 1250° C. Ordinarily, this may be done as described in Patents 2,185,218, 2,240,435, and 2,242,257, by regulating the rate of introduction of chlorine and carbon-ore mixtures, preferably in the form of briquettes, in accordance with periodic or continuous observation of the temperature of the reactor. Thus, if the temperature within the reactor begins to increase to an undesirable degree, the rate of introduction of ore, chlorine, carbon and air may be decreased, while if the temperature is too low, these rates may be increased. The temperatures may be also controlled by regulating the rate of withdrawal of the chlorinated residue since a large amount of heat may be dissipated by rapid removal of the residue and the reactor cooled by cool incoming ore. Moreover, the temperature may be controlled by manipulation of the amount of carbon and air or oxygen which is introduced. For a given carbon concentration an increase in the rate of chlorine introduction tends to increase the rate of reaction and consequently the temperature of operation.

If difficulty is encountered in maintaining the temperature, lumps of carbonaceous material such as coke may be introduced with or without briquettes of ore and the rate of oxygen introduced increased to burn the coke. If the reaction becomes excessively hot, it may be cooled by introduction of carbon dioxide. Further details of such process of chlorination may be found in the above mentioned patents.

Since the temperature of the reaction may be regulated with comparative ease at a temperature above about 850° C., and particularly above 1250° C., the rate of chlorination is capable of wide variation. In consequence, it is possible to control the temperature within the condenser over a wide area by variation of the rate of chlorination while maintaining the temperature of chlorination at the required value without externally heating the reactor or the condenser. This is particularly advantageous since the necessity of heating a portion of the condenser is eliminated and thus, it is possible to construct the condenser essentially of heat insulating material. If the temperature at the top of the tower becomes too low, the temperature and/or rate of chlorination may be increased. Likewise, if the temperature within the condenser becomes too high, the temperature and/or rate of chlorination may be decreased. Temperatures at the various portions of the condenser or furnace may be determined by usual thermocouples inserted in suitably located thermocouple wells.

The temperature within the condenser for any given throughput is also dependent upon the size of the condenser. Thus, an increase in the height and/or diameter of a condenser permits establishment of a lower temperature within the upper portion of the condenser. At all events, the condenser should be sufficiently large to permit the major portion of the condensation to occur out of contact with the furnace walls, whereby most of the chromic chloride is condensed before the gases containing the chloride contact to any substantial degree condenser walls which are cooled to a temperature capable of condensing chromic chloride. In usual operation condensers having a cross-sectional area of at least 3 square feet are utilized. In addition, the temperature within the condenser may be controlled by varying the thickness of the insulation. Thus, a variation in temperature from the point of entry to the top of the tower is insured by varying the thickness of insulation throughout the tower.

The temperature below the inlet 11 is maintained above about 400° C. and preferably 550 to 750° C. Ultimately, chromium chloride settles to the base of the condenser where it is withdrawn.

Uncondensed halides and exhaust gases are withdrawn through outlet 9. Thereafter, these gases may be treated to condense iron chloride or other halide. Processes similar to that herein described may be utilized for this purpose by use of similar condensers and maintenance of lower temperature.

The following examples are illustrative:

Example I 100 parts by weight of ore containing 29.2% Cr, 17.0% Fe, 7.2% Mg and 6.8% Al was mixed with 45 parts by weight of ground coke and 18 parts by weight of molasses. The mixture was made up into briquettes ½ to 1 inch in diameter and the briquettes were fired at 500° C. until volatile hydrocarbons were removed.

A shaft furnace having an internal diameter of 16 inches was preheated to 1000° C. by means of a coke fire. Thereafter, a charge of briquettes was introduced and chlorine and oxygen were introduced into the base of the furnace to initiate chlorination. The vapors resulting from the chlorination were introduced into a cylindrical condenser 3 feet in diameter and 20 feet high at a point 15 feet below the top outlet thereof.

The process was carried on continuously for many hours by introducing briquettes at a rate of 125 pounds per hour, chlorine at a rate of 133 pounds per hour and air at a rate of 2 volumes of air per volume of chlorine. The temperature within the ore bed remained at 1100° C. to 1400° C. throughout the run.

The mixture of vaporized halides entered the condenser illustrated in the drawing at a temperature of 1000° C. and were cooled to a temperature of 450° C. as they rose to the outlet. Chromic chloride condensed in vapor phase in the form of violet colored crystals which settled to the base of the condenser. Chlorine was introduced at a rate of 20 pounds per hour into the base of the condenser to maintain an atmosphere which consisted mainly of chlorine and the temperature at the base of the condenser remained at 600 to 650° C. This chlorine rose through the condenser and became mixed with the vapors of chromium chloride entering the condenser. Chromic chloride in the form of violet crystals of substantially uniform size and containing less than about 0.5 percent iron was withdrawn from the base of the furnace.

During a portion of the run chromic chloride was allowed to build up in the condenser to form a bed of 6 to 12 inches in depth. In another portion of the run the chromic chloride was withdrawn substantially as rapidly as collected. The purity of the product was substantially the same in both instances.

Example II

Gaseous chlorine cooled to 50° C. was introduced through inlet 14 into the condenser and mixed with a hot mixture of vaporized chromium and iron chlorides having a temperature of 1000° C. in the proportion of approximately two volumes of chlorine for each volume of the gaseous chlorides. The gas mixture on leaving the condenser was at a temperature of 350 to 450° C. Thereafter, the chromic chloride was allowed to settle from the gases and the uncondensed vapors were cooled to 50° C. to precipitate the iron chloride.

Example III

The process of Example I was repeated with the exception that the chlorine was introduced through inlet 14 adjacent the point at which the vaporized chlorides entered the condenser. Solid chromium chloride substantially free from iron chloride was thus obtained.

While the present invention is directed to the recovery of chromium chloride from vapors containing such chloride, it may be applied to the recovery of other solid halides such as nickel, copper, aluminum or iron chloride from vapors produced by the chlorination of nickel, copper, iron, or aluminum or other metal bearing material or to the fractional condensation of metallic chlorides such as magnesium or aluminum chloride from iron chloride, iron chloride from tin, titanium or arsenic chloride, etc.

Although the present invention has been described with particular reference to specific details of certain embodiments thereof, it is not intended that such details shall be regarded as limitations upon the scope of the invention except insofar as included in the accompanying claims.

This application is a continuation-in-part of application Serial No. 319,273, filed February 16, 1940.

I claim:

1. A method which comprises reacting a chromium bearing material with chlorine in amount not in excess of the theoretical required for chlorination of the chloridizable constituents including the iron and chromium constituents to the ferric and chromic state, whereby a quantity of chromous chloride is formed at a temperature sufficiently high to vaporize chromous chloride, adding a substantial quantity of chlorine to the vapor and condensing a chromium chloride therefrom.

2. A method which comprises reacting an iron chromium bearing ore with chlorine in amount not in excess of the theoretical required for chlorination of the chloridizable constituents including the iron and chromium constituents to the ferric and chromic state, whereby a quantity of chromous chloride is formed at a temperature sufficiently high to vaporize chromous chloride, adding a substantial quantity of chlorine to the vapor and condensing a chloride of chromium therefrom.

3. A method which comprises chlorinating a chromium bearing material to form and vaporize a vapor containing a vaporized chloride of chromium including a substantial amount of chromous chloride, adding to the vapor chlorine in the proportion of at least 5 volumes per 100 volumes of chlorine used in the chlorination step and condensing a chloride of chromium.

4. A method which comprises chlorinating a chromium bearing material to form and vaporize a vapor containing a vaporized chloride of chromium including a substantial amount of chromous chloride, adding to the vapor chlorine in the proportion of at least 10 volumes per 100 volumes of chlorine used in the chlorination step and condensing a chloride of chromium.

5. A method which comprises chlorinating a chromium iron bearing ore with an amount of chlorine not in excess of that theoretically required for chlorination of the chloridizable constituents including iron and chromium constituents to form ferric and chromic chloride, whereby chromic chloride, chromous chloride, and other chlorides are formed, vaporizing the chromic chloride, chromous chloride, and at least a portion of said other chlorides, adding chlorine to the vapors and fractionally condensing chromium chloride from the vapors of the other chlorides.

6. The process of claim 5 in which the amount of chlorine added to the vapors is in the proportion of at least 5 volumes per 100 volumes used in the chlorination.

7. A method which comprises forming a pervious bed comprising briquettes of an iron chromium ore and a carbonaceous reducing agent, introducing chlorine into the ore bed and maintaining the temperature and quantity of chlorine sufficient to form and vaporize a substantial quantity of chromous chloride together with other chlorides, adding chlorine to the vapors and condensing chromium chloride from the vapors of the other chlorides.

8. A method which comprises forming a pervious bed comprising briquettes of an iron chromium ore and a carbonaceous reducing agent, introducing oxygen and chlorine into the ore bed and maintaining the temperature and quantity of chlorine sufficient to form and vaporize a substantial quantity of chromous chloride together with other chlorides, adding chlorine to the vapors and condensing chromium chloride from the vapors of the other chlorides.

IRVING E. MUSKAT.